Oct. 6, 1936.                E. P. EVERETT                2,056,657
                              STAVE MACHINE
                        Filed Aug. 25, 1932           13 Sheets-Sheet 1
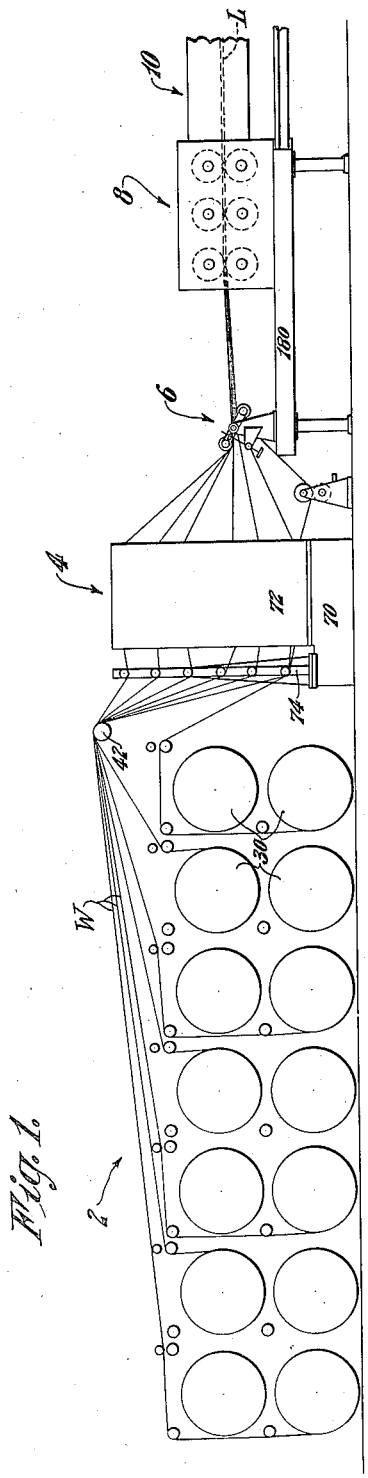
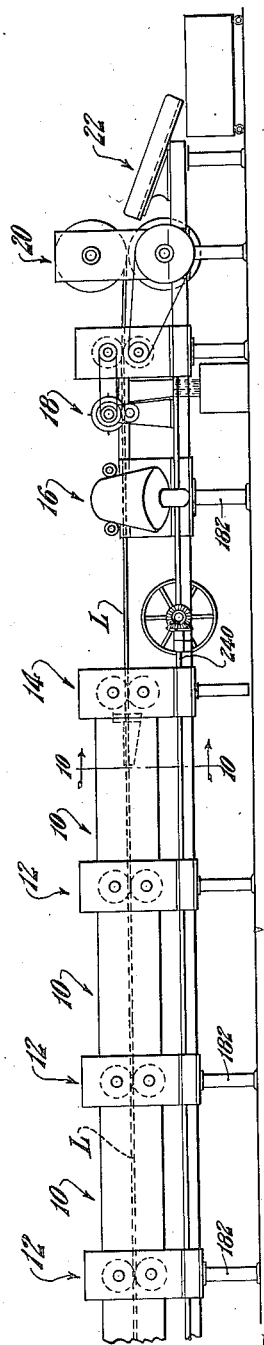
INVENTOR,
Ernest P. Everett,
BY
Walter C Ross
ATTORNEY.

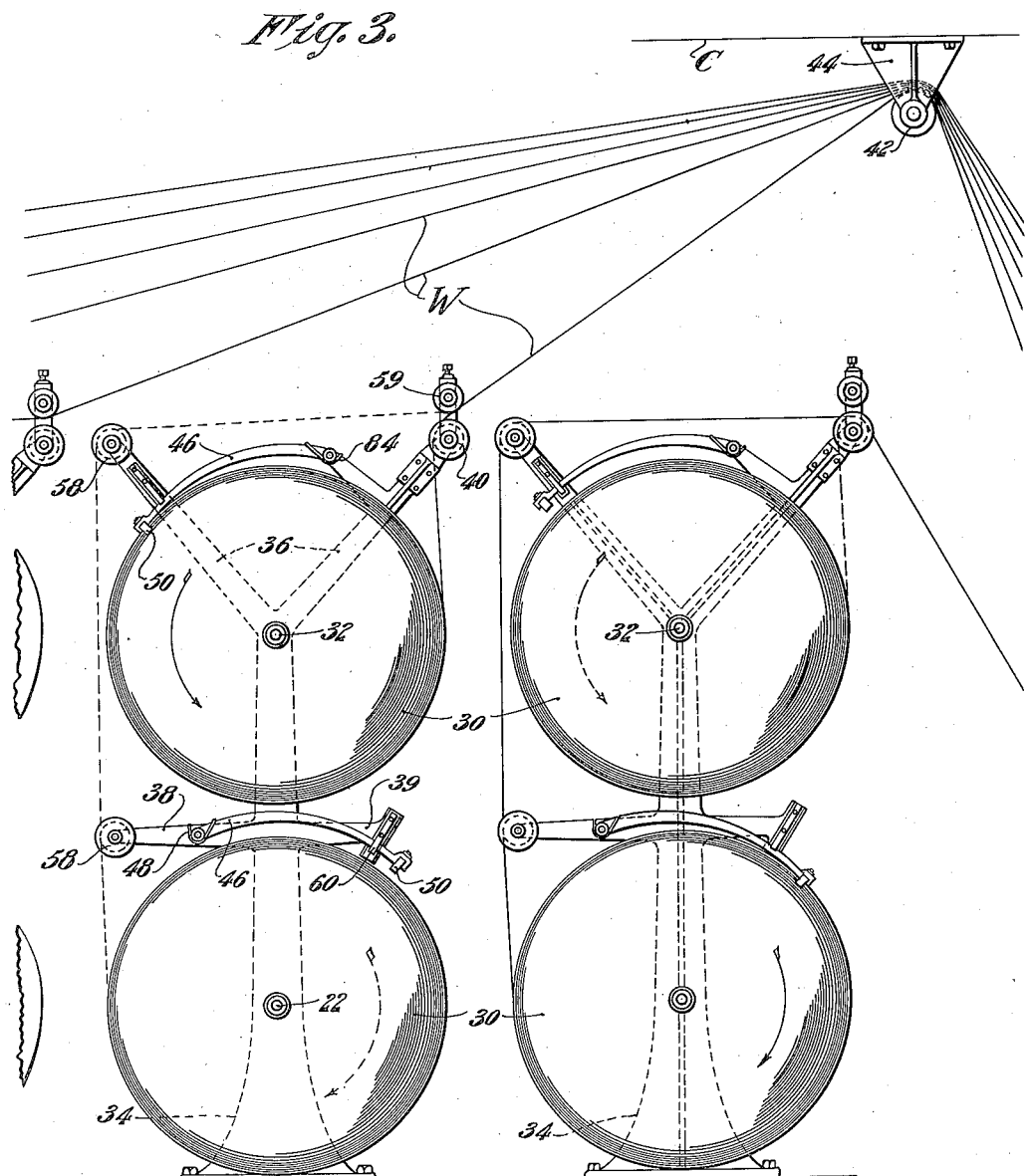
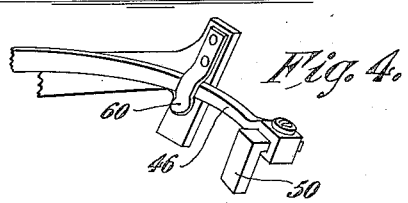

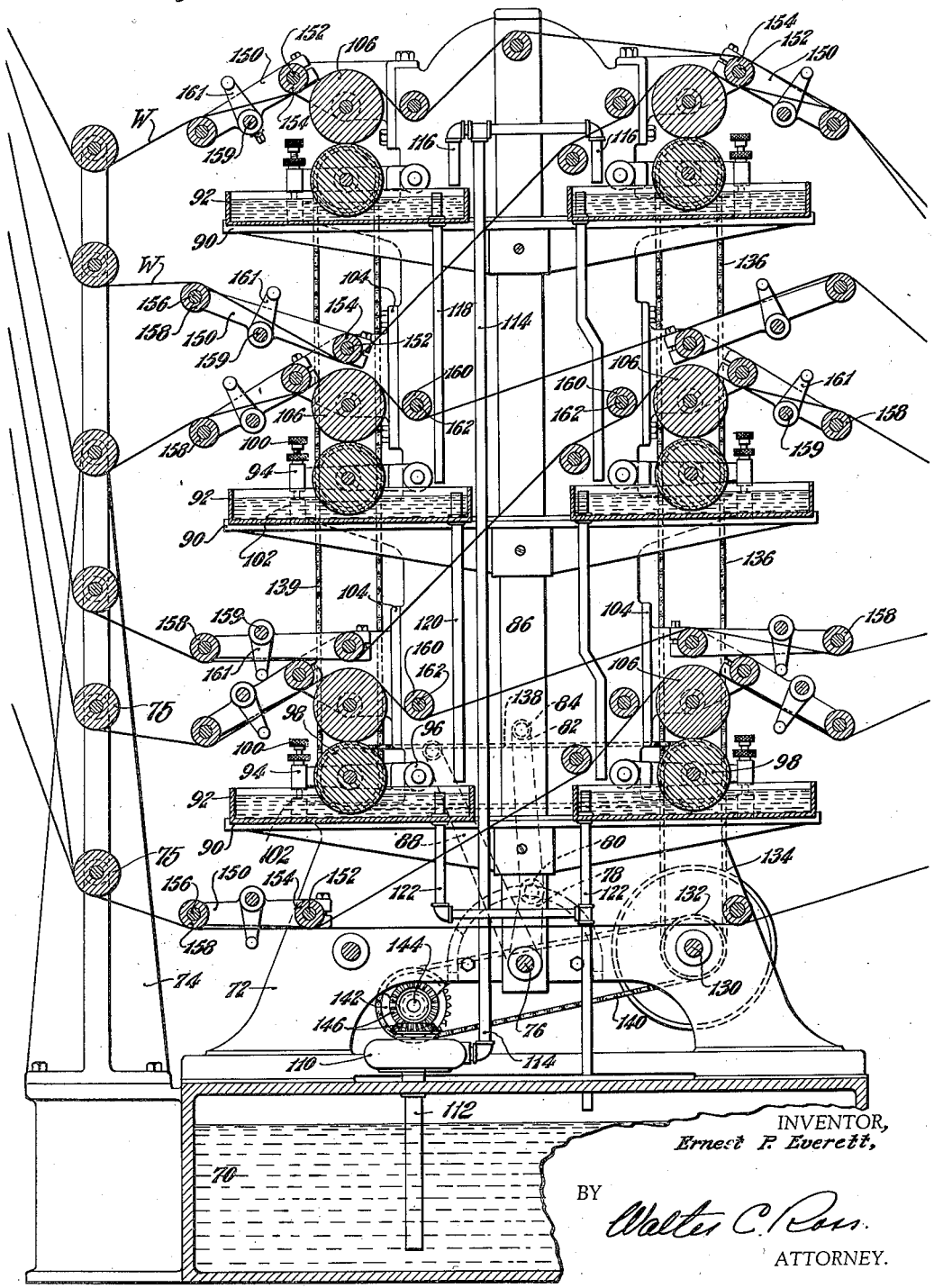

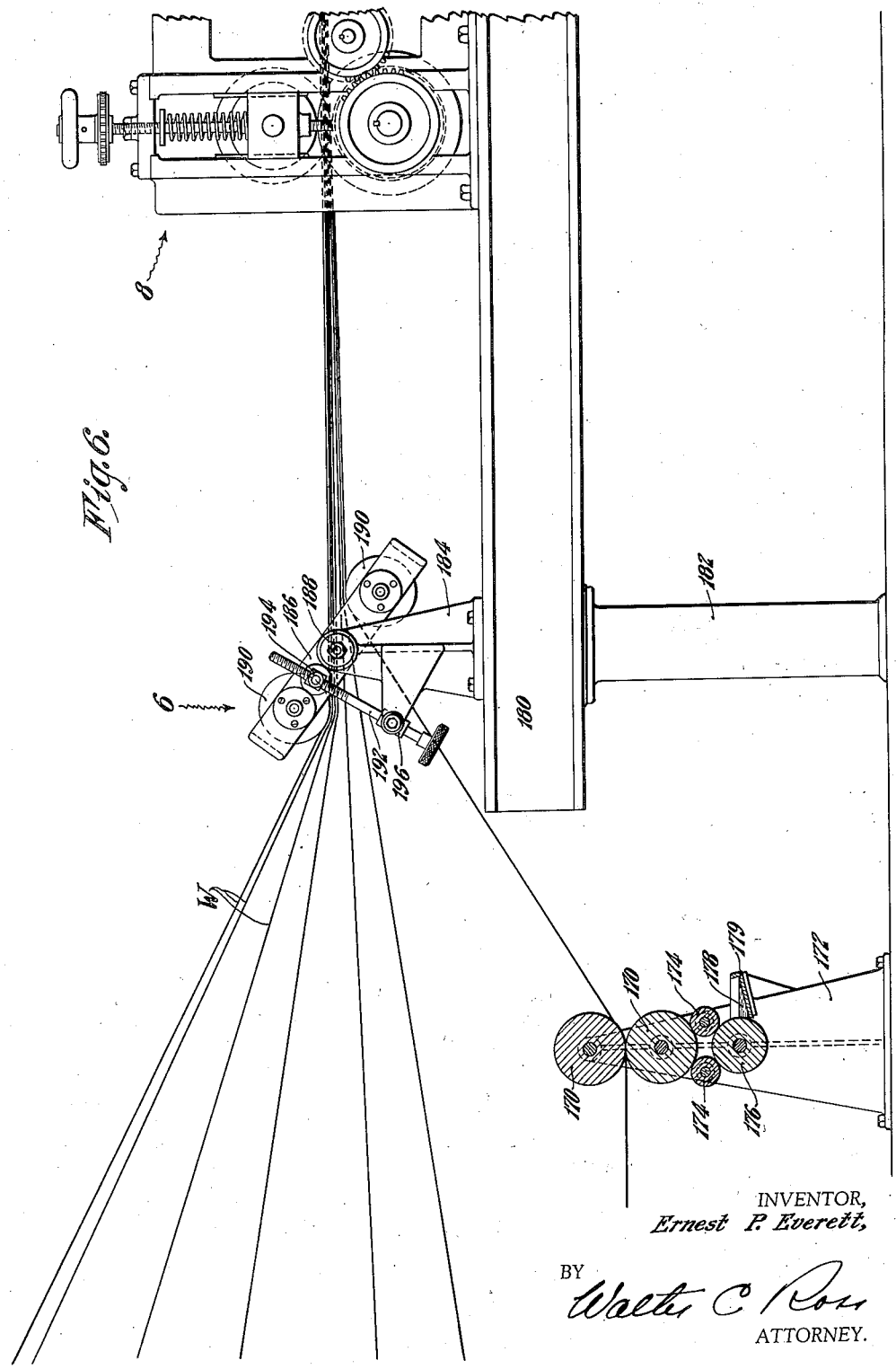

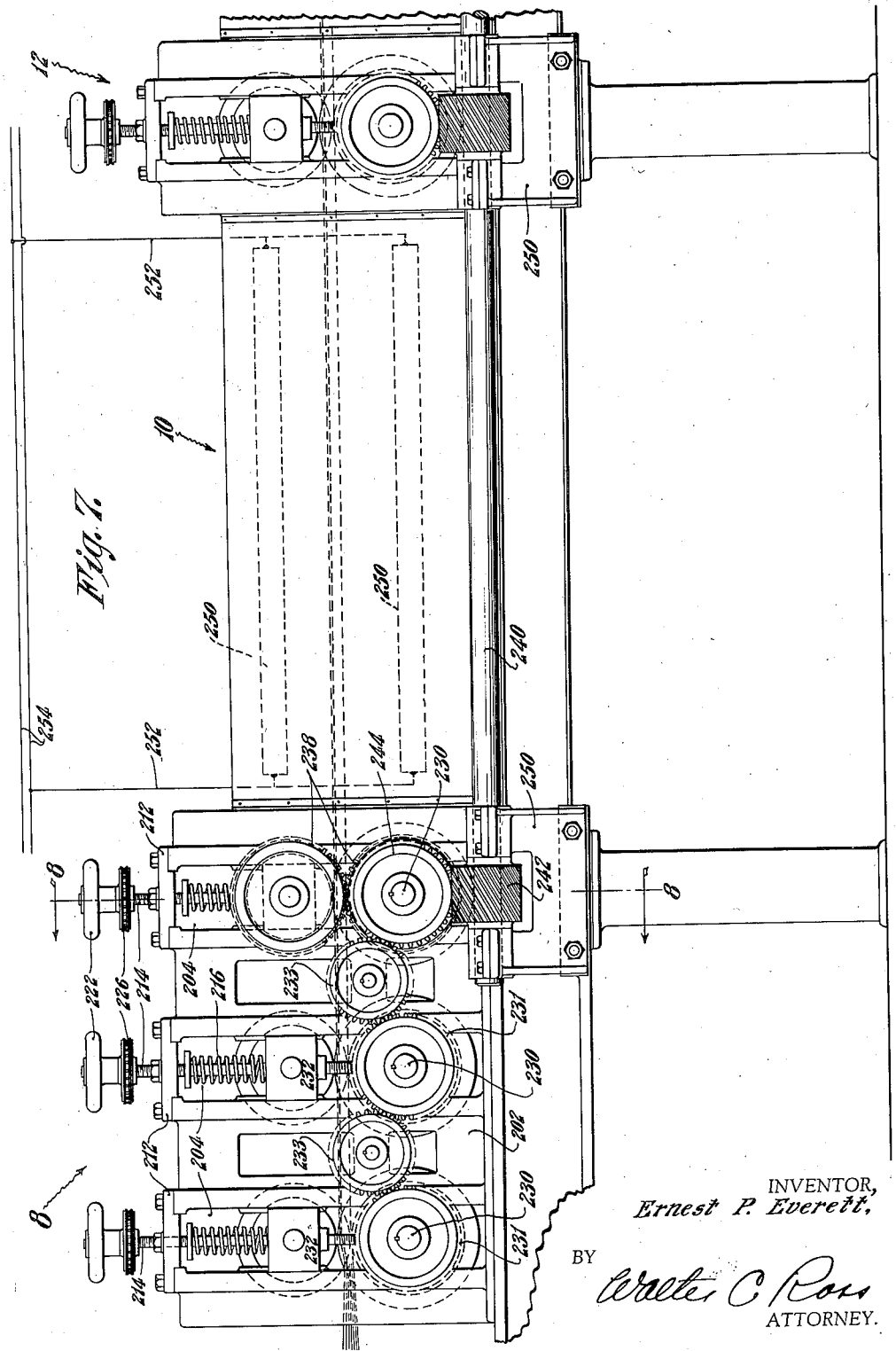

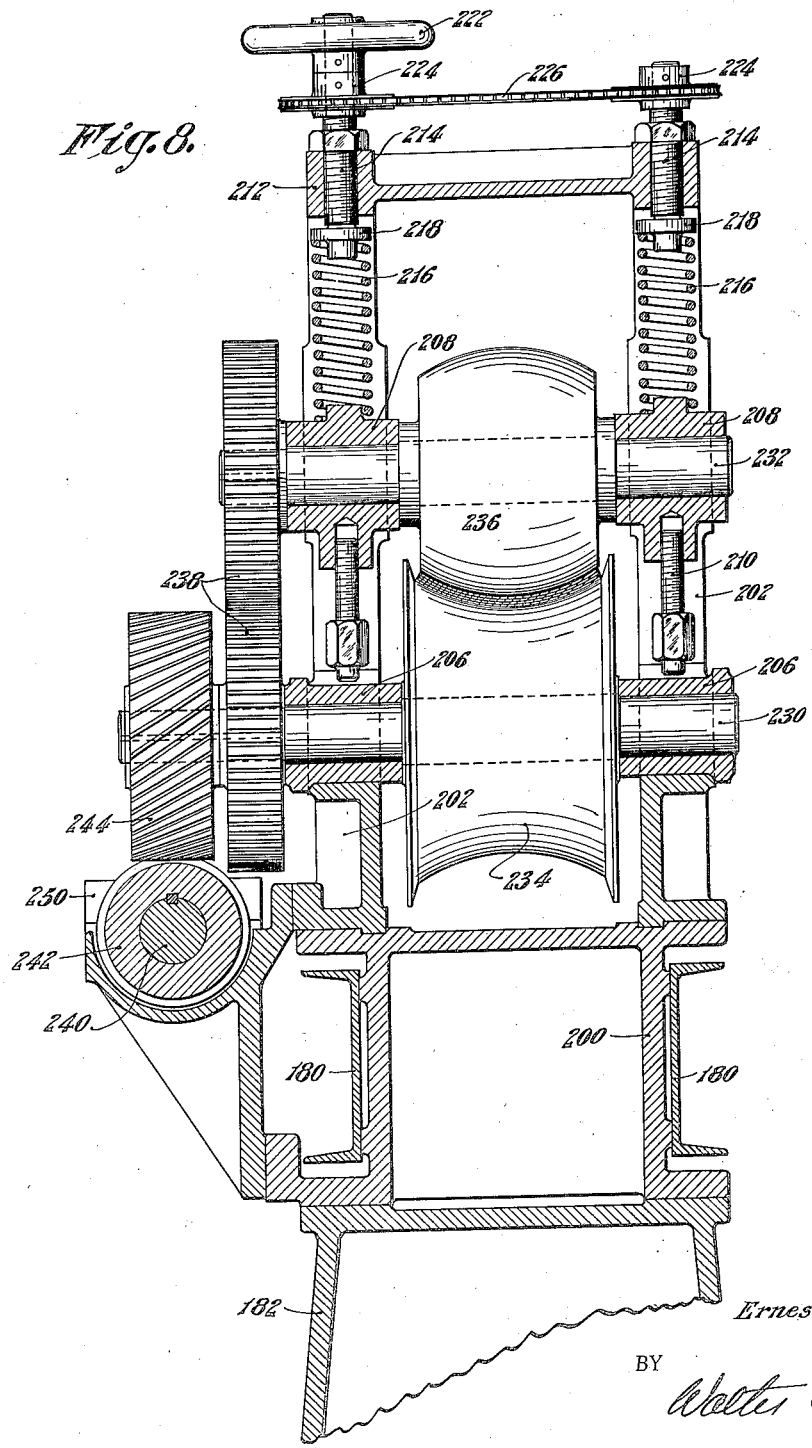

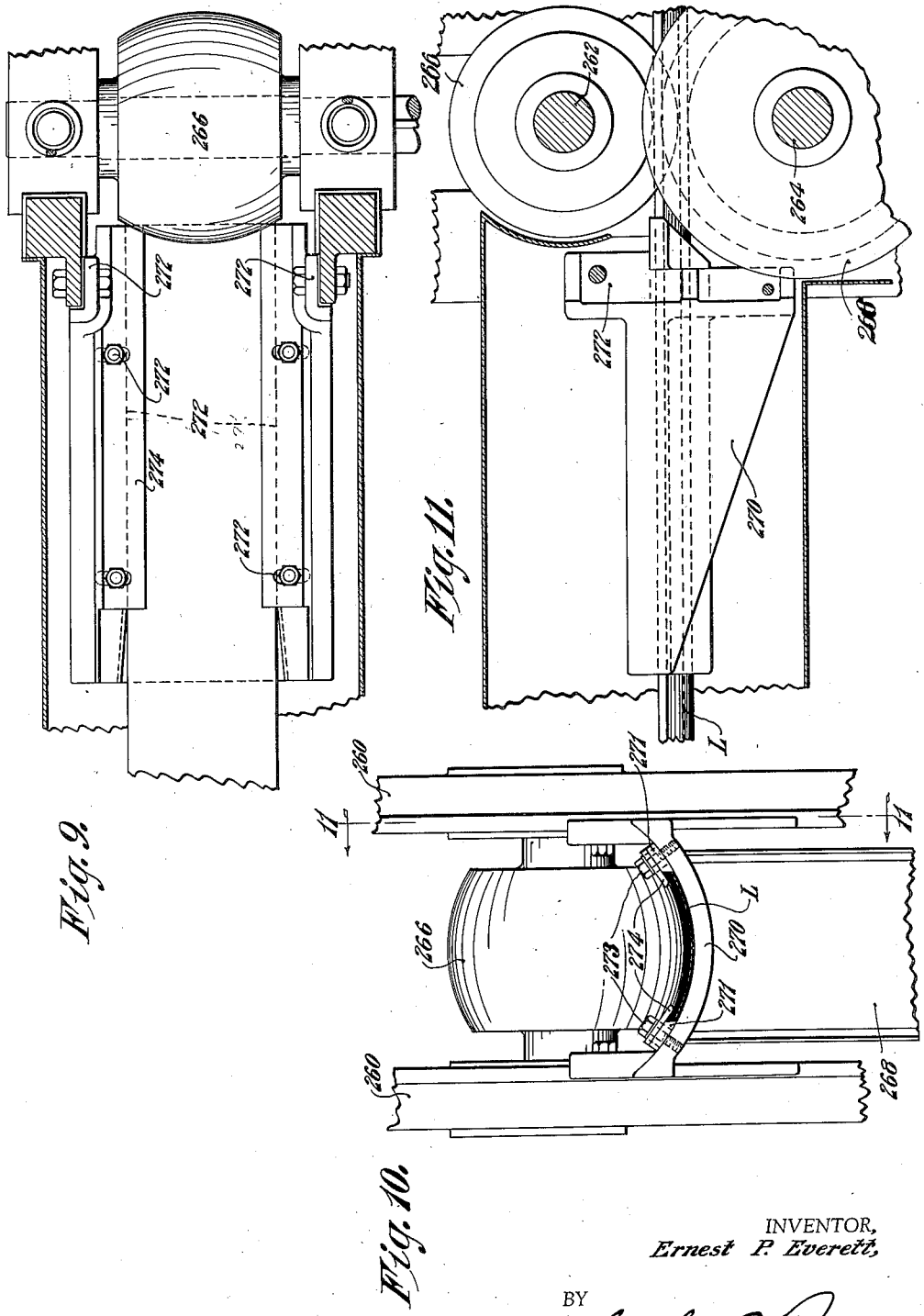

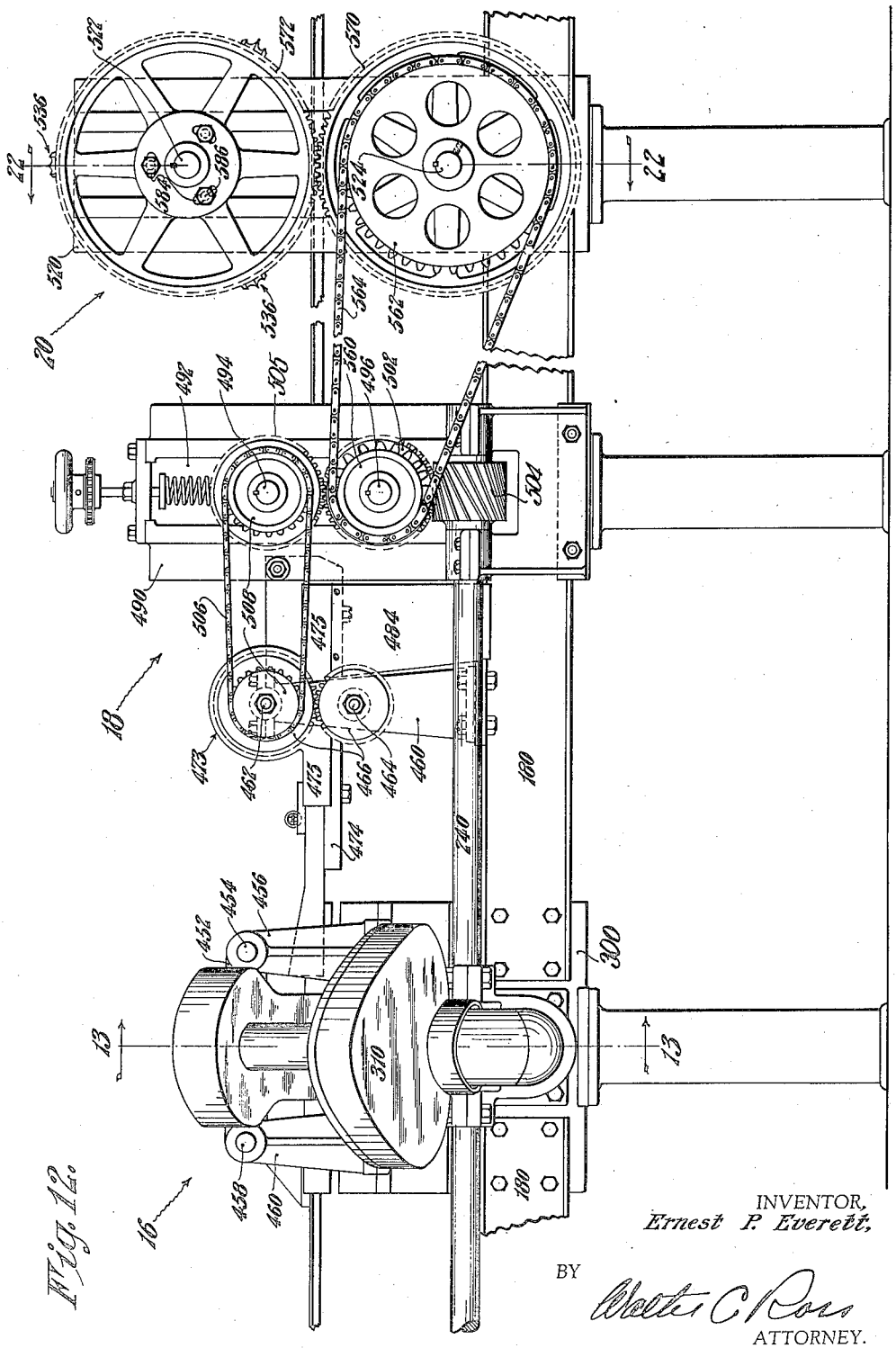

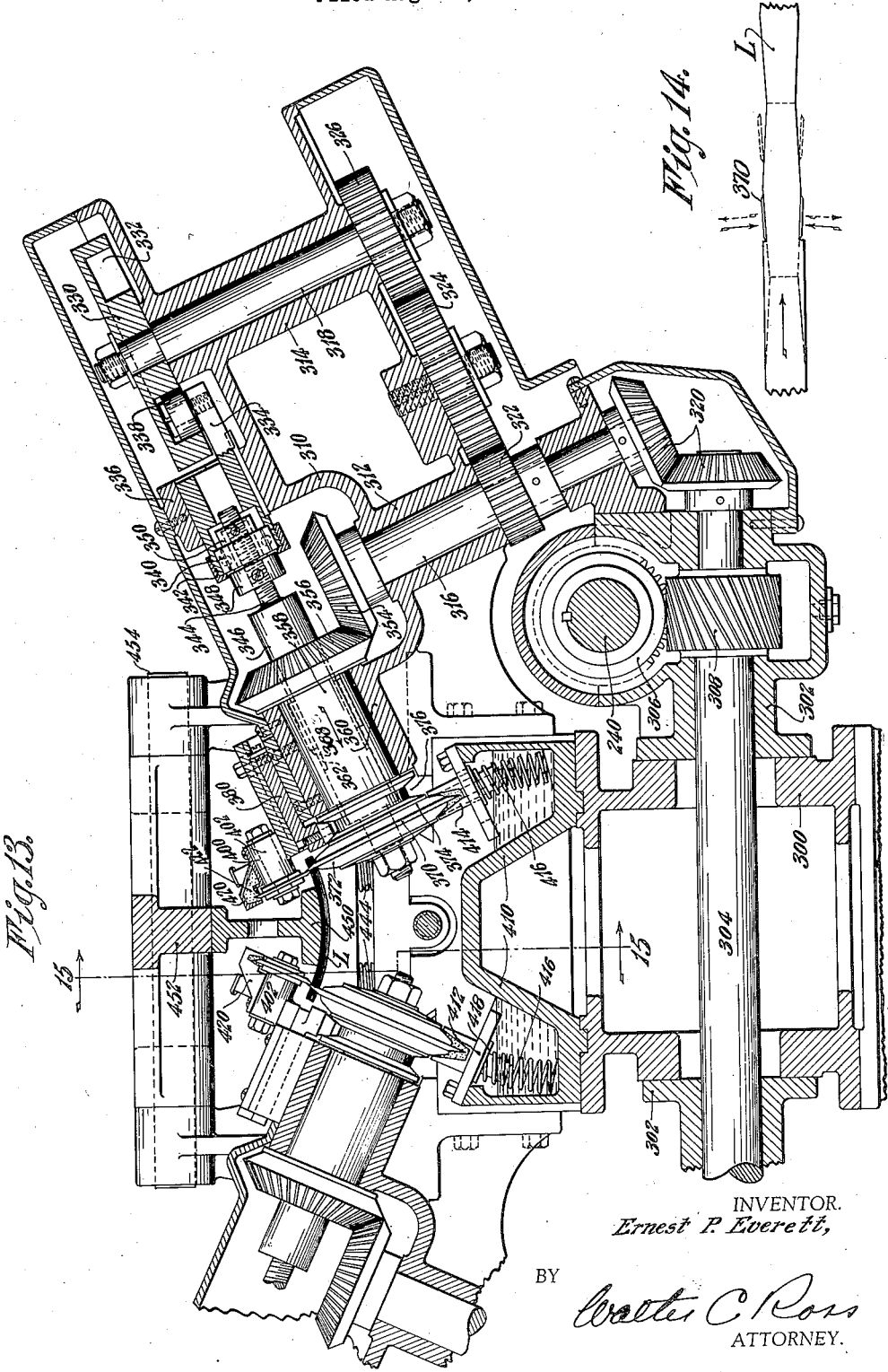

Oct. 6, 1936.　　　　E. P. EVERETT　　　　2,056,657
STAVE MACHINE
Filed Aug. 25, 1932　　　13 Sheets-Sheet 10

INVENTOR,
Ernest P. Everett,
BY
Walter C. Ross
ATTORNEY.

Oct. 6, 1936.  E. P. EVERETT  2,056,657
STAVE MACHINE
Filed Aug. 25, 1932   13 Sheets-Sheet 11

INVENTOR.
Ernest P. Everett,
BY
Walter C. Ross
ATTORNEY.

Oct. 6, 1936.  E. P. EVERETT  2,056,657
STAVE MACHINE
Filed Aug. 25, 1932    13 Sheets-Sheet 13

INVENTOR,
Ernest P. Everett,
BY
Walter C. Ross
ATTORNEY.

Patented Oct. 6, 1936

2,056,657

UNITED STATES PATENT OFFICE 2,056,657

STAVE MACHINE

Ernest P. Everett, Holyoke, Mass.

Application August 25, 1932, Serial No. 630,468

31 Claims. (Cl. 154—1)

This invention relates to improvements in the art of producing blanks of fibrous material and is directed more particularly to improvements in an apparatus for producing composite fibrous blanks, sections or staves, adapted to be fabricated into kegs, tubs, barrels and other forms of containers.

The invention has for its particular objects the provision of a novel method of and apparatus for producing staves or blanks including joined together superposed layers or plies of fibrous material. That is, a plurality of plies or webs of fibrous material are adhesively secured together and formed or shaped to provide a continuous laminated member from which blanks of predetermined dimensions and shape are successively severed.

According to the invention the apparatus includes certain novel features of construction and arrangement of parts whereby blanks or staves are produced in a continuous manner with efficiency and at a low cost.

Various novel features and advantages of the invention will be more fully hereinafter referred to in connection with the following description of the invention, which for purposes of disclosure is shown in the form at present preferred in the accompanying drawings, wherein:

Fig. 1 is a small scale diagrammatic side elevational view of the feed or left-hand end of the machine of the invention.

Fig. 2 is a similar view of the right-hand or delivery end of the machine, and is a continuation of that part of the machine shown in Fig. 1.

Fig. 3 is a side elevational view of a part of the web supplying apparatus at the feed end of the machine.

Fig. 4 is an enlarged perspective fragmentary view of one of the levers of the supply apparatus.

Fig. 5 is a longitudinal vertical sectional view through the adhesive applying unit located at the feed end of the machine.

Fig. 6 is a side elevational view showing the mechanism for assembling and guiding the various layers of material located forwardly of the adhesive applying unit.

Fig. 7 is a side elevational view showing a typical heating oven and the initial forming roll mechanism adjacent thereto.

Fig. 8 is a transverse sectional view taken on the line 8—8 of Fig. 7.

Fig. 9 is a plan view of guiding mechanism for the laminated web located forwardly of the trimming mechanism.

Fig. 10 is a transverse sectional elevational view of the same taken on the line 10—10 of Fig. 2.

Fig. 11 is a sectional elevational view taken on the line 11—11 of Fig. 10.

Fig. 12 is an enlarged side elevational view of the trimming, waste-cutting and crozing mechanism.

Fig. 13 is a partial transverse sectional view transversely of the machine on the line 13—13 of Fig. 12, showing the construction of the cutting or trimming mechanism.

Fig. 14 is a small scale plane view of the laminated web showing how its side edges are trimmed.

Figure 15:
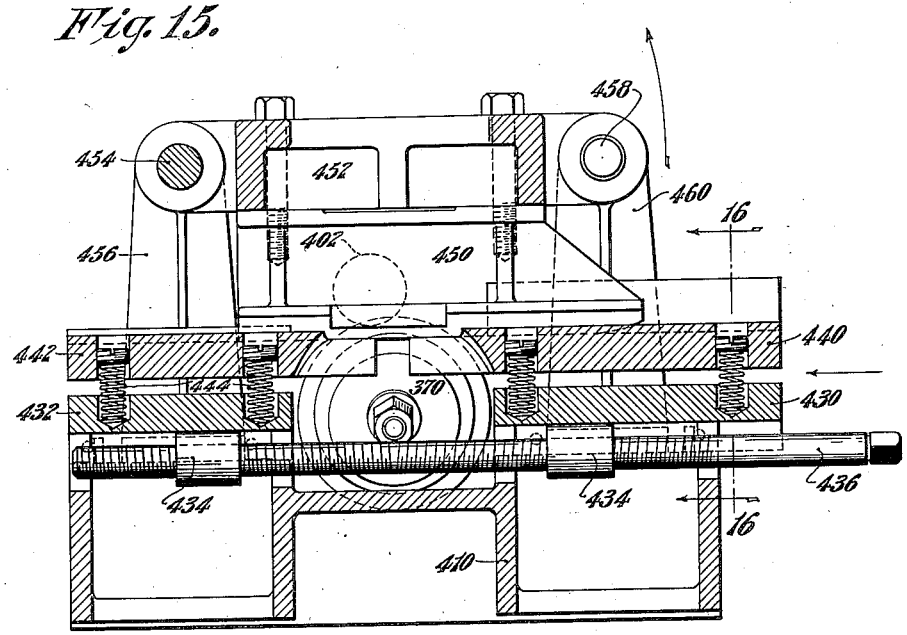
Fig. 15 is a longitudinal vertical sectional view on the line 15—15 of Fig. 13 showing certain details of construction.

Referring to the drawings more in detail the invention will be fully described. In order to facilitate a clear understanding thereof, the apparatus will first be described in a general way with reference to Figs. 1 and 2.

As is shown diagrammatically the apparatus of the invention includes a supply apparatus 2 for supplying a plurality of continuous webs W of fibrous material, such as paper, cardboard or the like. An adhesive applying unit 4 receives the webs and supplies certain faces thereof with adhesive material. The plies of material next pass through an assembling mechanism indicated generally by 6 and then between a plurality of coacting rolls constituting a pressing and forming mechanism indicated at 8, where the webs are formed into a laminated web L.

From the unit 8 the laminated web passes through alternate heater compartments 10 and other sets of rolls indicated generally by 12. From the last heating compartment 10 the laminated web passes through a guiding mechanism 14, then through a trimming unit 16 for trimming the side edges of the laminated web, through a scrap cutting mechanism 18 which cuts up the material trimmed from the edges of the web and finally the material passes through a croze and cut-off mechanism 20 wherein staves are severed from the leading end of the web and crozed on one or both ends and finally the staves are delivered into a chute 22 or the like.

A detail description of the apparatus will now be proceeded with.

The plies or separate webs of material W are supplied to the apparatus in rolls 30. As in Fig. 3 these rolls are supported on studs or arbors 32 which extend forwardly from frames or supports 34. The members 34 are spaced apart and may be suitably secured to the floor and have on their upper ends diverging arms 36 and other arms 38 and 39 therebelow.

It is desired that each member 34 carry a pair of rolls 30 one above the other. The web from one roll of a pair may be led into the machine, while the other roll is in reserve to be used when the first-mentioned roll is used up. In this way a saving in time is effected.

Guide rolls 40 are rotatable on the right-hand arms 36 over which webs may be led. From said rolls the webs may pass upwardly over a roll 42 which is rotatable in a bracket 44, preferably affixed in a rigid manner to the ceiling C, or the like.

Levers 46 are pivoted for swinging movements on the arms as shown and are spring-pressed downwardly by means of springs 48 associated therewith. These levers function to exert more or less friction on the rolls and prevent a too rapid rotation thereof so as to thereby eliminate slack. Keepers 50 are adjustable in the forward ends of the levers 46 and are arranged to bear against the outer sides of the rolls and in that way prevent the webs of the rolls from slipping sideways during the rotation thereof.

Other guide rolls 58 are provided for guiding the webs from the lower rolls 30. When the upper roll has been used up its last end is spliced to the leading end of the lower roll. A roll 59 is located above each roll 40 which is arranged to press the spliced together webs against the roll 40.

Springs 60 are arranged to yieldingly engage the levers 46 as they are moved upwardly away from the rolls and hold the same against downward movement. This is desirable to facilitate the placing of rolls on the arbors.

Any number of the members 34 may be used so that any desired number of separate webs may be supplied the apparatus. It will be understood that the webs may have any desired width, depending of course on the width of the finished stave it is desired to produce.

The mechanism for applying adhesive to webs or runs of material will now be described, with particular reference to Fig. 5.

Fig. 5, as has been stated, is a vertical longitudinal section through the mechanism for applying adhesive material to the webs or runs of fibrous material. A base preferably in the form of a supply tank 70 supports side frames 72 at opposite sides of the machine. The forward frame (not shown) is preferably open to expose the mechanism. Rearwardly of the frames 72 there are a pair of other spaced frames 74.

A shaft 76 is mounted for oscillatory movements in the frames 72 at the lower side thereof and carries arms 78 adjacent the frames, the upper ends of which are pivoted at 80 to links 82 connected at 84 to vertically reciprocable bars 86.

A lever 88 fixed to the shaft 76 outside the frame 72 is provided for oscillating the said shaft, whereby the bars 86 are raised and lowered. Supports or tables 90 are fixed to the bars 86 so as to be raised and lowered therewith. These carry on opposite sides thereof pans 92 for adhesive material. Arms 94 are adjacent to and have their inner ends pivoted at 96 to the said side frames and rolls 98 are journalled between the arms which take up adhesive in the pans. Adjusting screws 100 in the outer ends of the levers 94 are arranged to bear on projections 102 extending from opposite sides of the frames 72, whereby the arms 94 may be raised and lowered and supported in various positions of adjustment.

Brackets 104 are fixed to opposite sides of each of the frames 72 and have journalled therebetween upper rolls 106. By adjusting the screws 100 the arms 94 may be elevated so that the rolls 98 may bear more or less on the rolls 106.

The tank 70 may carry adhesive material in a liquid form and a suitable pump 110 is located on the upper side thereof. A suction pipe 112 of the pump extends into the tank 70 and a discharge pipe 114 extends outwardly therefrom. Outlets 116 at the upper end of the pipe 114 are arranged to deliver adhesive material to the uppermost pans 92. Overflow pipes 118 associated with the uppermost pans 92 are arranged to convey adhesive to the tanks 92 therebelow and other pipes 120 associated with the intermediate tank likewise delivering adhesive to the lowermost tanks. Interconnected overflow pipes 122 are associated with the lowermost pans and discharge into the supply tank 70.

In operation adhesive material is pumped upwardly and delivered into the uppermost pans 92 from whence it overflows into the intermediate pans and from such pans to the lower pans and back to the tank 70. In this way the level of adhesive material is maintained at a predetermined point in each of the pans 92 so that the rolls 98 associated therewith may have the surfaces thereof supplied with adhesive and these in turn apply it to the upper rolls 106.

A drive shaft 130 is rotatable in the frames 72 at the right-hand side thereof and is connected by a sprocket 132 and chain 134 to the roll 98 thereabove. All of the lowermost rolls 98 on the right-hand side of the frame are connected by a chain 136. The lowermost roll 98 at the left-hand side of the machine is driven by means of a chain connection indicated at 138 and this lower roll 98 imparts rotative movements to the rolls 98 thereabove by means of a chain 139. In this way all of the lowermost roll 98 is driven from the drive shaft 130. A chain 140 driven from a suitable sprocket on the shaft 130 is in engagement with a sprocket 142 of a shaft 144. This shaft is geared by means of gears 146 to the pump 110 so that the pump is operated from the drive shaft 130.

It is desired that the frame 72 on the forward side of the machine be provided with openings to make the mechanism readily accessible.

The drive shaft 130 may be driven from any convenient source of power such as a motor, line shaft or the like and will of course be driven at such a speed as will bring about the proper operation of the rolls 98.

Arms 150 are adjustable on transverse shafts 152 and these shafts have rotatable thereon guide rolls 154. Other shafts or rods 156 carried in the outer ends of the arms 150 have rotatable thereon other guide rolls 158. The arms 150 are adjustable for guiding the several webs of material into contact with the adhesive applying rolls 106. Numerous other rolls 160 are rotatable on shafts 162 to facilitate the webs being led through the adhesive applying apparatus in various ways whereby either side of any of the webs may be supplied with adhesive material. Rods 159 extending between the arms 150 have guides 161 adjustable therealong. These guides may be set at opposite sides of the webs to guide the same as they pass through the machine.

It is desirous, according to one feature of the invention, that one face of at least one of the webs be decorated or ornamented. To accomplish this a pair of rolls 170 (see Fig. 6) are provided which are rotatable between frames 172. The lowermost roll 170 may carry imprinting plates which may be supplied with ink or other decorating material. Rolls 174 receive a supply of ink from an ink roll 176 the periphery of which picks up ink 178 from a font 179.

The assembling mechanism indicated by 6 will now be described, with particular reference to Fig. 6.

A pair of spaced rails 180 extend forwardly of the machine from the adhesive applying material and are supported at suitable intervals by supports 182. A pair of brackets 184 are supported by the rails 180 adjacent the ends thereof and adjacent the adhesive applying apparatus. A yoke 186 is mounted therebetween at 188 for swinging movements. The yoke 186 extends across the machine between the members 184 and carries rolls 190 rotatable therein. An adjusting screw 192 in threaded engagement with a nut 194 pivoted on the yoke 186 has its lower end mounted for rotation in a member 196 pivoted to one of the brackets 184. By turning the screw 192 in one direction or the other the yoke is swung on its pivotal axis to move the rolls so that their axes of rotation may be disposed in various positions.

The webs of material which have been supplied with the adhesive material are led between these rolls 190 which are preferably set to draw the webs together or towards one another, as is shown in Fig. 6.

From the assembling mechanism the webs are led between rolls to be described for pressing them together and forming them when desired. This mechanism indicated by 8 will now be described with particular reference to Figs. 7 and 8.

A base 200 is fixed between rails 180 and carries upwardly extending side plates 202. These plates 202 are provided with vertically disposed slots 204 in spaced relation. Lower bearing boxes 206 are located in the slots 204 and upper bearing boxes 208 are slidable in the said slots thereabove. Adjusting screws 210 at the lower sides of the boxes 208 are arranged to bear on the lower boxes 206 to limit the downward movement of the upper boxes. Caps 212 are affixed to the upper ends of the members 202 to close the slots 204 and have upper adjusting screws 214 in threaded engagement therewith. Springs 216 between the upper boxes and collars 218 of the screws 214 exert pressure on the boxes and function to yieldingly resist upward movements thereof. The screws 214 at one side of the machine carry hand wheels 222 while sprockets 224 affixed to the screws in the opposite frames are connected by chains 226. As the hand wheels 222 are rotated in one direction or the other the screws at opposite sides of the machine are simultaneously rotated for varying the tension of the springs.

Shafts 230 are journalled for rotation in the lower boxes 206 and shafts 232 are journalled in the upper boxes 208. Rolls 234 and 236 are affixed to the shafts 230 and 232, the lower one of which has a concave peripheral surface while the other has a convex surface all as shown. Gears 238 are affixed to the forward shafts 230 and 232, whereby the shafts may rotate at predetermined relative peripheral speeds. The lower forward shaft 230 is driven from a main drive shaft 240 which extends along one of the rails 180 and which carries a gear 242 meshing with a gear 244 of the shaft 230.

This shaft 240 is suitably journalled in bearings 250 at suitable intervals along the rail and is arranged to drive the different units in a proper timed relation.

The different pairs of rolls between the members 202 may be adjusted to obtain alike or different rolling actions and being relatively concave and convex as they are they are adapted to press upon the superposed webs of material to press them together and simultaneously give the laminated structure the desired curvature.

The other shafts 230 carry other gears 231. Idler gears 233 mesh with these gears 231 and with the gear 238 whereby the shafts 230 are rotated by the shaft at the right.

The units 12 may have one or more pairs of rolls similar to those described in connection with the unit 8. In any case the gears for connecting the upper and lower shafts may be omitted so that an upper roll may run as an idler roll. In some cases it may be desired to reverse the curvature of the rolls from that shown in Fig. 8. The desirability will depend of course upon the results it is required to obtain. Not only may the coacting rolls function to press and curve the laminated web, but they will function to feed the same forwardly.

In each case it will be desired that the lower roll shaft be driven. This may well be done by means of gears suitably arranged to connect said lower shaft with the drive shaft 240.

The duct or oven 10 such as that between the unit 8 and the next adjacent unit 12 may consist of sheet metal walls suitably arranged to enclose the laminated web as it passes from one unit to the next. It may be heated by electric coils indicated generally at 250 in Fig. 7. These coils may be of usual form and connected as indicated diagrammatically in said Fig. 7 by wires 252 to a current supply line 254. If desired the temperature in the ducts or ovens may be maintained at alike or different predetermined temperatures. That is, one duct may be maintained at a higher degree of temperature than an adjacent duct. Such variations together may with the variations in pressure of the rolls depend more or less upon the results to be obtained by means of the apparatus. The heated ducts will tend to dry the laminated web and to condition the same.

As the laminated web enters the guiding unit 14 it is desired to position the same so that it runs on the longitudinal center line of the apparatus. The mechanism to accomplish this will now be described with particular reference to Figs. 9, 10, and 11.

Side supports 260 extend above the side rails and have upper and lower shafts 262 and 264 rotatable therein. These shafts carry upper and lower rolls 266 and 268 for receiving in the bite thereof the laminated web and may be operated in a manner like that for operating the rolls previously described.

A horizontally disposed support or table 270 has its forward ends 272 fixed to the inner sides of the frames 260 and extends rearwardly thereof to underlie the laminated web L so that the advancing web slides therealong.

Guide blocks 271 at the opposite sides of the table are arranged for adjustment towards and away from one another by means of screws 273. These guides have on their upper sides bar 274 which overlies the web L so as to hold it down on to the support 270. By moving the members 271 towards and away from the center line of the machine it is possible to guide the laminated web L in such a way that it travels on the true center line of the apparatus. This is necessary for the trimming of the laminated web as will be described presently.

Before describing the mechanism for trimming the edges of laminated web, it will be explained that where the laminated material is to be used for the staves of barrels, kegs and the like, it is necessary to taper and/or curve the web which is to be severed into staves whereby the staves have the proper shape and when placed side by side will form a keg, barrel or pail having the desired curving or tapering sides.

The trimming mechanism 16 will be explained with reference to Figs. 12, 13, 15, 16, 17, 18, and 19.

A support 300 is carried by the rails 180 to which is affixed at outer sides and above the rails, bearings 302. A transverse shaft 304 is journalled in said bearings 302 and carries a driven gear 308 which meshes with a gear 306 of the drive shaft 240.

This shaft 304 functions as the driving shaft for the mechanism for trimming the side marginal edges of the laminated web. There are two trimming mechanisms, one at either side of the machine, but being similar in construction only one will be described.

A housing 310 for each of the trimming mechanisms is fixed to the outer side of the bearing members 302, previously mentioned. This has an inner bearing 312 and an outer bearing 314, which have rotatable therein a drive shaft 316 and a cam shaft 318. As will be seen with reference to Fig. 13, these shafts are disposed in an angular relation. The shaft 316 is driven by means of gears 320 from the shaft 304, while the shaft 318 is driven from shaft 316 by means of gears 322, 324 and 326.

A cam 330 is fixed to the upper end of shaft 318 and has a cam groove 332 in the lower side thereof. A cam follower 334 is reciprocable in a part 336 of the housing 312 and has a roll 338 on its outer end which works in the cam groove 332. A ball bearing 340 is held against relative endwise movement in the inner end of the cam follower 334 by means of a clamp ring 342, and a threaded end 344 of a shaft 346 is clamped to the inner race of the bearing 340 by means of collars 348 and 350. The shaft 346 is free to rotate relative to the follower and is moved back and forth accordingly as the follower is moved back and forth by the cam.

A gear 354 is fixed to the upper end of the shaft 316 and meshes with a gear 356, the hub 358 of which is rotatable in a bearing 360 of the member 312. As the shaft 316 is rotated the gear 356 is rotated to rotate the shaft 346 by means of a key 363 slidable in a spline 362 of said shaft.

A circular knife or cutter 370 is clamped between flanges 372 and 374 at the inner end of the shaft 346. As shaft 346 is rotated the knife is rotated thereby while as the shaft is reciprocated back and forth the knife is likewise moved towards and away from the center line of the machine.

The flange 374 is provided with an annular groove 376 which receives a roll 378 on the lower side of a sub-slide 380. This sub-slide 380 is slidable back and forth in a suitable way of member 384 affixed to the upper side of bearing 360. A top slide 390 on the slide 380 and movable therewith is surmounted by plates 392 which serve as hold-downs to facilitate sliding movements of the slides. A screw 396 in threaded engagement with the sub-slide 380 has a flange 398 in a suitable groove in the lower side of slide 390. By turning the screw 396 in one direction or the other the slides 380 and 390 are adjusted relative to one another. The slide 380 is moved back and forth accordingly as the shaft 346 is moved back and forth.

A shaft 400 is rotatable in a bearing 402 of the upper slide 390 and carries on its outer end a knife 404 of circular form, a portion of the periphery of which contacts with and co-operates with the knife 370 therebelow for trimming an edge of the laminated web.

The axis of rotation of the shafts 346 and cutter or knife 370 is disposed at an angle with respect to the horizontal so that the edge of the material is cut on an angle corresponding to a plane which passes substantially through the axis of the curvature thereof. This is so that adjacent edges of staves when set up to form a keg or barrel will align with one another or at least coincide to the desired extent.

Figure 17:
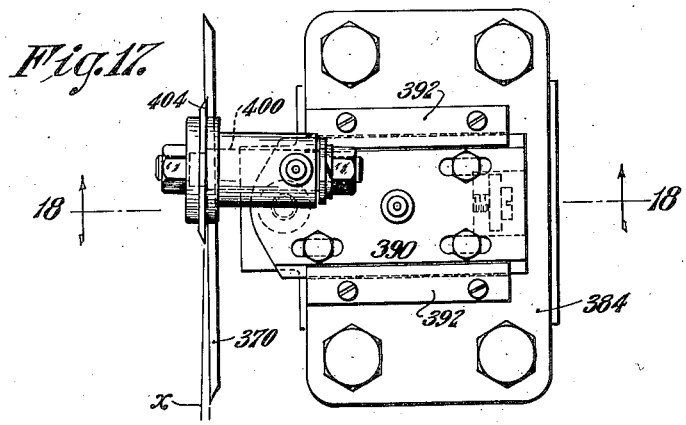
Fig. 17 is a plan view of certain of the parts shown in Fig. 13.
Figure 18:
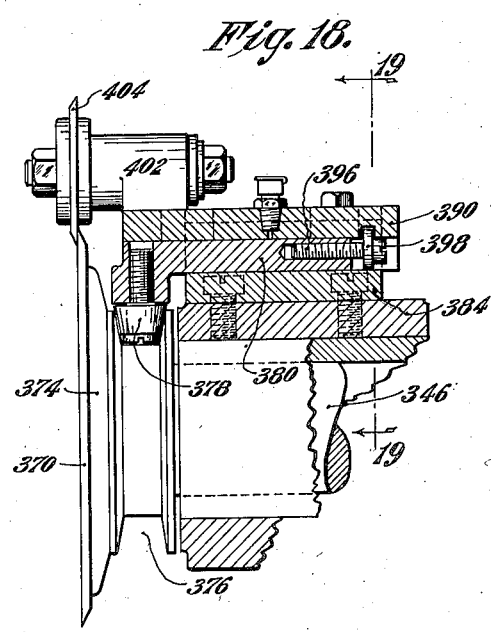
Fig. 18 is a sectional view on the line 18—18 of Fig. 17.
Figure 20:
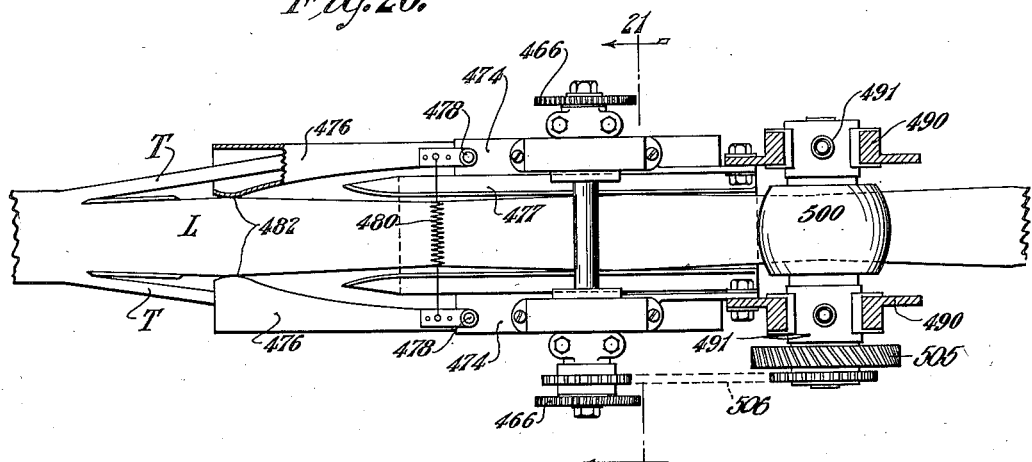
Fig. 20 is a plan view of cutting mechanism for cutting up material trimmed from the laminated web.

The axes of the cutters 370 are also disposed so that the plane of their cutting edges lies at an angle with respect to the center line of the machine or to the sides or marginal edges of the laminated web as shown in Figs. 14, 17, and 20. This is so the cutter will make a clean cut during its movement in and out and towards and away from the center of the machine. The parts in the embodiment of the invention shown are so arranged and timed that the cutters 370 move from between outer and inner positions, while the laminated web is traveling therepast the length of one stave, so that when the laminated web is cut off to stave length, the sides of the stave will be properly trimmed.

As shown in Fig. 14, the web is trimmed, on opposite sides, in such a manner as to form a stave for a barrel or keg. It will be readily appreciated however that the parts may be arranged to move the cutter so as to provide a straight taper from end to end of a stave. Also in some cases it may be desired to curve the opposite sides of the staves in various ways.

Figure 19:
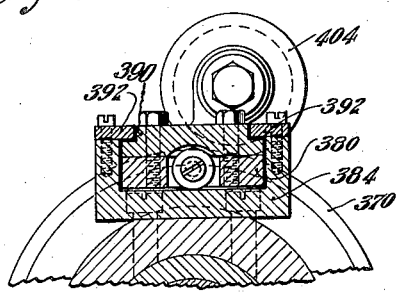
Fig. 19 is a sectional elevational view on the line 19—19 of Fig. 18.

The axis of rotation of the cutter 404 is offset from the axis of rotation of the cutter 370, as shown in Figs. 17 and 19. This is so that the peripheral cutting edges of the cutters will contact for cutting at a point substantially above the axis of the lower cutter 370. This has been found to be desirable for the most efficient cutting or trimming action.

Pans 410 below the cutters 370 of the cutting mechanism carry plates 412 through which extend tubes 414 containing wicking, wool or the like, with which the cutters contact in rotation. Springs 416 bear on parts 418 of the tubes. The wicking extends downwardly into a supply of lubricant so that the cutters in their rotation are supplied with a sufficient amount of lubricant to prevent the fibrous material adhering thereto. Other similar devices 420 are fixed to the bearings 402 and carry wicking 422 through which the upper cutters pass and by the means of which the upper cutters are kept clean and in proper cutting condition.

Figure 16:
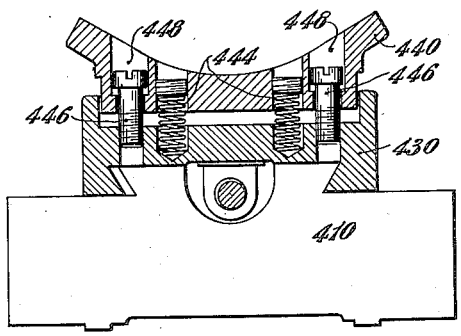
Fig. 16 is a transverse sectional elevational view on the line 16—16 of Fig. 15.

Means for guiding the laminated material as it passes through the cutting mechanism will now be described with reference to Figs. 15 and 16.

Lower base plates 320 and 430 are guided for movements back and forth longitudinally of the machine on the member 410 and have depending bosses 434 in which an adjusting screw member 436 is threaded. This screw 436 may be turned in one direction or the other to move the members 430 and 432 towards and away from one another and thereby make it possible to remove or replace the cutters 370. Upper plates 440 and 442 are yieldingly mounted on the lower plates 430 and 432 by means of springs 444 interposed therebetween. The plates 440 and 442 are held or limited in their upward movement by screws 446 in threaded engagement with the lower plates and which have their heads slidable in openings 448 of said upper plates.

The upper plates 440 and 442 support the laminated web as it is fed through the machine and by means of the springs are caused to exert a yielding pressure upwardly so as to yieldingly hold the laminated web against a longitudinally extending shoe 450 fixed to the lower side of a movable member 452. The member 452 is mounted for swinging movement on a rod 454 carried between brackets 456. Rods or pins 458 are slidable in brackets 460 and are receivable in suitable openings in the end of the member 452. By moving the pins 458 outwardly the member 452 may be swung upwardly to carry the shoe from off the laminated web supported by the plate to permit access to the cutters.

The lower face of the shoe 450 is suitably curved as shown in Fig. 13, and is adapted to operate on the laminated web with an ironing action, while the plates 440 and 442 yieldingly urge the web against the lower side thereof. In this way the material is confined between the shoe and the plates at a point between the cutters on either side of the web whereby the laminated web is held against shifting movements and firmly embraced for the cutting or trimming action while the web is being fed forwardly of the machine.

Figure 21:
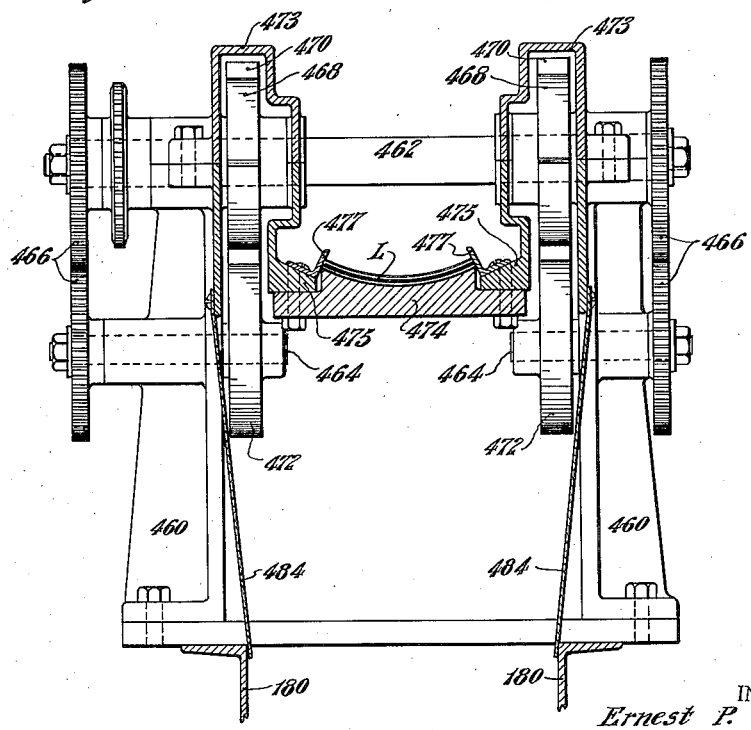
Fig. 21 is a transverse sectional view on the line 21—21 of Fig. 20 at a larger scale showing certain details of construction.
Figure 22:
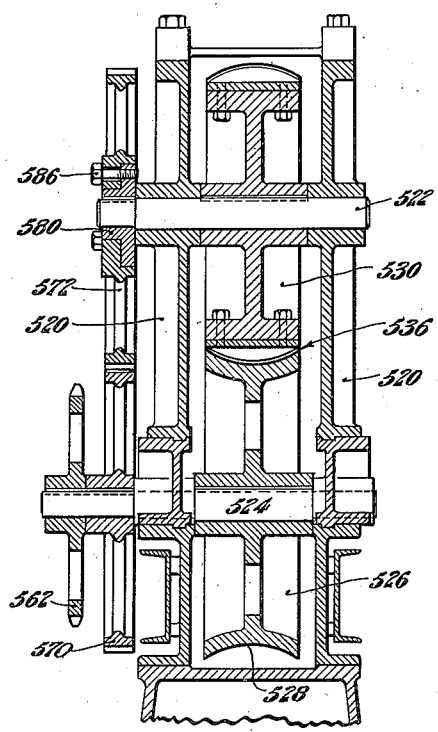
Fig. 22 is a transverse sectional elevational view through the croze and cutting off mechanism and is taken on the line 22—22 of Fig. 12.
Figure 23:
Fig. 23 is a plan view of one of the croze and cut-off mechanisms.
Figure 24:
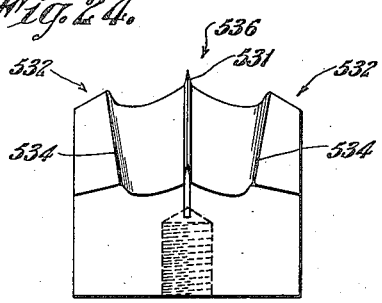
Fig. 24 is an enlarged end elevational view of the same.

Means indicated by 18 for cutting up the material trimmed from the laminated web will now be described with reference to Figs. 12, 20, and 21.

Side supports 460 are carried by the rails forwardly of the trimming mechanism and have journalled in the upper side thereof a shaft 462. Lower shafts 464 are journalled therebelow in the members 460 and pairs of gears such as 466 operatively connect the said upper and lower shafts. Cutters 468 fixed to the upper shaft 462 have radially extending blades 470 which in the rotation of the shaft engage with the periphery of lower disks 472 on shafts 464. Guards 473 are carried by the members 460 and have parts 475 which extend forwardly and rearwardly therefrom and which carry a supporting plate 474 for supporting the laminated web L.

Tubular guide members 476 are pivoted at 478 to the plate 474 and are connected by tension springs 480 so that their forward curving ends 482 are yieldingly urged against the side edges of the laminated web L.

These guides 476 receive waste material being trimmed from the side edges of the web as is indicated by T and carry the same forwardly so that the trimmed material passes between the rolls 468 and 472 whereby it is severed into small pieces by the knives 470. The waste pieces are directed downwardly by walls 484 at opposite sides of the machine which form a chute. In this way the waste may be collected to free the machine of pieces of laminated web.

Side guides 477 are carried by the member 475 for guiding the laminated web in its forward movements. A pair of brackets 490 forwardly of the cutting mechanism are suitably associated with the side rails 180 and are provided with vertical slots 492. Upper and lower shafts 494 and 496 are journalled in boxes such as 491 located in said slots 492 and carry relatively concaved and convexed rolls the upper one 500 of which is shown in Fig. 20. These rolls, as in the manner already described, operate on the laminated web to press and form it if necessary and assist in the advancing movement thereof through the machine.

A gear 502 of the lower shaft 496 meshes with a gear 505 of the upper shaft and with a gear 504 of the drive shaft 240, whereby the shafts are operated in proper timed relation. A chain 506 is in association with sprockets 508 on the shafts 494 and 462 whereby the shaft 462 of the trimming mechanism is driven from the upper roll shaft 494.

In the operation of the apparatus material is trimmed from the sides of the laminated web and is chopped or cut up by this cutting up mechanism, while the web is fed forwardly between the rolls of the shafts 494 and 496 after which it is passed to the croze and cutting off mechanism now to be described and indicated generally by 20. (See Figs. 10, 12, 22, 23, 24, and 25.)

Side supports 520 are associated with the rails 180 forwardly of the trimming mechanism 18 and have rotatable therein an upper shaft 522 and a lower shaft 524. A drum 526 of the lower shaft 224 has concave face 528, while a drum 530 of the upper shaft is convex for receiving therebetween the laminated web L. Spaced around the drum 530 are cutting off and croze mechanisms indicated generally by 536. The croze and cutting off devices are substantially alike and therefore only one need be described in detail.

Each croze and cut-off device includes a cutting off knife 531 and croze die members 532 at opposite sides thereof. The knife 531 is curved to conform to the contour of the surface 528 of the lower drum 526 as are the croze dies 532.

Figure 25:
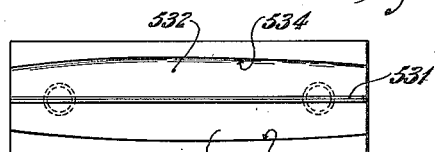
Fig. 25 is a longitudinal sectional elevational view through an end of a stave.

In the rotation of the drums the knives sever the laminated web to provide staves of suitable length, while the croze dies press on the web to form the croze and bevel the adjacent ends of adjacent staves, as shown in Fig. 25.

Ridges 534 of the members 532 which form the croze in the ends of the staves like the knife 531 extend from end to end thereof and across the drum 530 in curving relation to correspond to the curvature of the surface of the drum 528 and web. According to a special feature of the invention, the croze ridges are wider apart nearer their central portion than at the ends. This is to provide a croze in the end of the stave which extends in a straight line thereacross.

Gears 570 and 572 are associated with shafts 522 and 524. A sprocket 560 of the shaft 496 and a sprocket 562 of the shaft 524 are connected by a chain 564 whereby the shaft 524 is driven from the shaft 496. The gear 572 is adjustable on the shaft 522 by means of the following: The gear 572 is movable on and about a flange 580 fixed to the shaft 522 and is provided with slots 584 which receive clamp bolts 586 in threaded engagement with the flange 580. By loosening the bolts 586 the gear 572 may be rotated in one direction or the other relative to the flange 580 and secured in various positions of angular adjustment so as to vary the angular setting position of the croze and cutting off devices of the drum 530. In this way it is possible to set the croze and cutting off devices so that they will act on the laminated web at the proper places and thereby sever the web into staves correctly in relation to the trimmed sides thereof.

In the operation of the apparatus a number of rolls of fibrous material in web form are placed in the web-supplying apparatus 2, so that the webs may be passed to the adhesive supplying mechanism 4. In the adhesive supplying apparatus the faces of the webs are supplied with adhesive material and then the webs are led through the assembling mechanism 6 where they are brought together for subsequent pressing and forming operations.

In case it is desired to ornament or decorate a face of one of the webs such a web may be passed through the rolls provided for that purpose just forwardly of the adhesive applying mechanism.

The webs from the assembling apparatus are led through the mechanism 8 for initially rolling and forming the webs into a laminated structure and which may have curves formed transversely thereof. From this apparatus 8 the laminated web passes through alternate ducts 10 and other pressing and forming units 12 which not only press the laminated structure and enhance the curvature thereof but may also assist in feeding the web in its laminated form forwardly of the machine.

The laminated web structure is guided centrally of the machine by the unit 14 and delivered thereby into the trimming mechanism 16 which operates to trim the sides of the laminated web and form successive joined together lengths having the desired curved or tapering side edges as may be desired.

From the trimming mechanism the laminated web passes through the scrap cutting mechanism 18 wherein the scrap material trimmed from the side edges of the web is cut up and finally the web passes through the croze and cutting off mechanism 20. The croze and cut-off mechanism is operated to sever the laminated web into separate staves of the desired length and at the same time when necessary crozes and forms the ends of the stave which are delivered therefrom in a finished state into a delivery chute 22.

As has been stated, the shaft 240 extends along one side of one of the side rails to operate the units supported thereby. By driving the different units from the shaft by means of suitable gears or other driving connections, each unit will operate in a proper timed relation with respect to the other units and in a continuous manner so that a plurality of webs of fibrous material are secured together to form a laminated structure which is formed and cut to provide separate staves.

The staves or blanks may be made in various sizes and shapes for fabricating into barrels, kegs, pails, tubs, and containers of various shapes and dimensions.

Various changes and modifications may be made in the form of the invention without departing from the spirit and scope thereof, and it is therefore desired to be limited, if at all, by the appended claims rather than by the foregoing description of the present preferred form of the invention shown and described.

What is claimed is:

1. In an apparatus of the class described, means for supplying a continuous laminated web, and means for continuously trimming the side edges of said web including rotating members movable towards and away from said web.

2. In an apparatus of the class described, means for supplying a continuous laminated web, means for continuously trimming the side edges of said web including continuously rotating members movable towards and away from said web and means for receiving and cutting up material trimmed from said web.

3. In an apparatus of the class described, means for supplying a continuous laminated web, means for continuously trimming the side edges of said web including continuously rotating members movable towards and away from said web, and continuously operating means intermittently acting on said web to sever separate blanks therefrom.

4. In an apparatus of the class described, means for supplying a continuous laminated web, means for continuously trimming the side edges of said web including continuously rotating members movable towards and away from said web, continuously operating means intermittently acting on said web to sever separate blanks therefrom having means associated therewith for simultaneously crozing and levelling adjacent ends of adjacent blanks.

5. In an apparatus of the class described, means for supplying a continuous laminated web, means for continuously trimming the side edges of said web including continuously rotating members movable towards and away from said web and means for decorating at least one of said webs.

6. In an apparatus of the class described, means for supplying a continuous laminated web, means for continuously trimming the side edges of said web including continuously rotating members movable towards and away from said web and means for yieldingly embracing opposite sides of said web as it is acted upon by said trimming means.

7. In an apparatus of the class described, means for supplying a continuous laminated web, means for continuously trimming the side edges of said web including continuously rotating members movable towards and away from said web and means for guiding said web into said trimming means.

8. In an apparatus of the class described, means for continuously feeding a web of laminated material, rotary trimming members at opposite sides thereof, means for moving the same towards and away from said web and other members co-operating with said trimming members and movable therewith.

9. In an apparatus of the class described, means for continuously feeding a web of laminated material, rotary trimming members at opposite sides thereof, means for moving the same towards and away from said web, other members co-operating with said trimming members and movable therewith and means for yieldingly embracing and guiding said web adjacent said trimming members.

10. In an apparatus of the class described, means for continuously feeding a web of laminated material, rotary trimming members at opposite sides thereof, means for moving the same towards and away from said web and other members cooperating with said trimming members and movable therewith, the said first-named members being rotatable on axes angularly disposed with reference to a line across said web and other trimming members being rotatable on axes offset horizontally with respect to said first-named axes.

11. In an apparatus of the class described, transversely disposed rotatable shafts mounted for reciprocation in a support, means for reciprocating the same during rotation, cutters at adjacent ends thereof, slides reciprocable in said supports, means associated with said shafts and slides whereby the latter are reciprocated by the former and cutters rotatable in said slides coacting with the first-named cutters for acting on side edges of a web.

12. In an apparatus of the class described, a pair of members slidable in a support, means associated therewith for moving said members towards and away from one another, members yieldably mounted on said first-named members for yieldingly bearing on one side of a laminated web and a shoe for bearing on the opposite side of said web.

13. In an apparatus of the class described, a pair of members slidable in a support, means associated therewith for moving said members towards and away from one another, members yieldingly mounted on said first-named members for yieldingly bearing on one side of a laminated web and a shoe for bearing on an opposite face of said web, the said shoe being movable towards and away from said last-named members.

14. In an apparatus of the class described, a support for a continuous laminated web, means for continuously trimming side edges from said web, coacting cutter members at opposite sides of said web for cutting material trimmed therefrom into short lengths of scrap, and guides for engaging the sides of a web for receiving the trimmed material and guiding it to said cutter members.

15. In an apparatus of the class described, a support for a laminated web, means for trimming side edges from said web, coacting rotatable members at opposite sides of said web for cutting material trimmed therefrom and yieldable guides for engaging the sides of a web for receiving trimmed material and guiding it to said rotatable members, and means engaging opposite sides of said web for guiding the same forwardly through the apparatus.

16. In an apparatus of the class described, means for trimming opposite side edges of a laminated web to form the side edges of separable blanks, a pair of continuously rotating members, croze and cut-off devices on one of said members angularly disposed to act on adjacent ends of adjacent separable blanks to sever and croze the same.

17. In an apparatus of the class described, means for trimming side edges of a laminated web to form the side edges of separable blanks, continuously rotating rolls for receiving said web, associated croze and cut-off devices associated with one of said rolls angularly disposed to sever and croze adjacent ends of adjacent separable blanks, gear connections between said rolls and means associated therewith for adjusting the angular relation of said rolls.

18. In an apparatus of the class described, means for feeding a continuous web of material, means for pressing the same to impart transverse curvature thereto, rotary trimming members for trimming the side edges of the web, said trimming members being mounted on axes disposed at an angle when viewed in elevation in order to allow for the transverse curvature of the web and to bevel the side edges of the web, and means to rotate said trimming members at relatively high speed.

19. In an apparatus of the class described, means for feeding a continuous web of material, means for pressing the same to impart transverse curvature thereto, rotary trimming members for trimming the side edges of the web, said trimming members being mounted on axes disposed at an angle when viewed in elevation in order to allow for the transverse curvature of the web and to bevel the side edges of the web, and means to rotate said trimming members at relatively high speed, and cooperating rotary trimming knives mounted on axes substantially parallel to the axes of the main trimming members but on the opposite side of the web.

20. In an apparatus of the class described, means for feeding a continuous web of laminated material, means for pressing the same to impart transverse curvature thereto, rotary trimming members for trimming the side edges of the web, said trimming members being mounted on axes disposed at an angle when viewed in elevation in order to allow for the transverse curvature of the web and to bevel the side edges of the web, and means to rotate said trimming members at relatively high speed, cooperating rotary trimming knives mounted on axes substantially parallel to the axes of the main trimming members but on the opposite side of the web, said cooperating trimming knives being adjusted in face to face relation with the main trimming knives and being offset in the direction of movement of the web when viewed in plan in order to bring the cutting points substantially in vertical alignment with the axes of the main trimming members.

21. In an apparatus of the class described, means for continuously feeding a web of material, means for imparting to said web transverse curvature, trimmers at each edge of the web for trimming the side edges thereof, each trimmer including a rotary cutter, means to rotate the same, means to transversely reciprocate the same, the axis of the cutter being disposed at an angle when viewed in elevation in order to bevel the edge of the web, and gearing interconnecting the web feeding and trimmer reciprocating mechanisms.

22. In an apparatus of the class described, means for continuously feeding a web of material, means for imparting to said web transverse curvature, trimmers at each edge of the web for trimming the side edges thereof, each trimmer including a rotary cutter, means to rotate the cutter, means to transversely reciprocate the cutter, the axis of the cutter being disposed at an angle when viewed in elevation in order to bevel the edge of the web and being disposed at an angle when viewed in plan in order to provide clearance for the cutting edge despite transverse reciprocation of the cutter, and gearing interconnecting the web feeding and trimmer reciprocating mechanisms.

23. In an apparatus of the class described, means for continuously feeding a web of material, trimmer assemblies at each edge of the web for trimming the side edges thereof, each assembly including a rotary cutting knife at one side of the web, cooperating means at the opposite side of the web, means to rotate the knife, means to transversely reciprocate the assembly, the axis of the knife being disposed at an angle when viewed in plan in order to provide clearance for the cutting edge despite transverse reciprocation of the cutter, and gearing interconnecting the web feeding and trimmer reciprocating mechanisms.

24. In an apparatus of the class described, means for continuously feeding a web of material, trimmer assemblies at each edge of the web for trimming the side edges thereof, each assembly including a main rotary cutting knife at one side of the web, an auxiliary rotary cutting knife at the opposite side of the web, means to rotate the main knife, means to transversely reciprocate the assembly, the axis of the main knife being disposed at an angle when viewed in plan in order to provide clearance for the cutting edge despite transverse reciprocation of the cutter, said auxiliary cutter being offset in plan from the main cutter in the direction of movement of the web, and gearing interconnecting the web feeding and trimmer reciprocating mechanisms.

25. In an apparatus of the class described, means for continuously feeding a web of laminated material, means for imparting to said web transverse curvature, trimmer assemblies at each edge of the web for trimming the side edges thereof, each assembly including a main rotary cutting knife at one side of the web, an auxiliary rotary cutting knife at the opposite side of the web, means to rotate the main knife, means to transversely reciprocate the assembly, the axis of the main knife being disposed at an angle when viewed in elevation in order to bevel the edge of the web and being disposed at an angle when viewed in plan in order to provide clearance for the cutting edge despite transverse reciprocation of the cutter, and gearing interconnecting the web feeding and trimmer reciprocating mechanisms in proper timed relation.

26. In an apparatus of the class described for manufacturing staves, means to feed and shape a continuous web, and a rotating croze and cut-off mechanism for severing the web into separate blanks, said mechanism including mating concave and convex rollers for receiving the web, the convex roller being provided with a cut-off knife and croze dies on either side of said knife, the spacing of the croze dies from the knife being greater at the center than at the side edges of the wheel in order to provide a croze which is straight and parallel to the cut-off edge of the blank.

27. In an apparatus of the class described for manufacturing staves, means to feed and press a continuous web to impart transverse curvature thereto, means for so trimming the side edges of the web as to bevel and shape the web into stave blanks arranged end to end, means to croze the blanks, and means to sever the blanks from the web, the means to croze the blanks departing from parallelism to the means to cut the blanks in such a manner as to produce a croze lying parallel to the cut edge of the blank.

28. In an apparatus of the class described for manufacturing laminated staves, means to feed and press a continuous laminated web to impart transverse curvature thereto, means for so trimming the side edges of the laminated web as to bevel and shape the web into stave blanks arranged end to end, and a rotating croze and cut-off mechanism for severing the web into separate blanks, said mechanism including mating concave and convex rollers for receiving the web, the convex roller being provided with a cut-off knife and croze dies on either side of said knife, the spacing of the croze dies from the knife being greater at the center than at the side edges of the roller in order to provide a croze which is straight and parallel to the cut-off edge of the blank, and gearing interconnecting the feed, trimmer, and croze and cut-off mechanisms for operation in proper synchronous relation.

29. In an apparatus of the class described for manufacturing laminated staves, means for supplying separate webs of material, means for applying adhesive to said webs, and means for pressing and conditioning the same to form a continuous transversely curved web, said means including a plurality of alternate pressing and heating mechanisms, whereby the web may be conditioned for succeeding trimming, crozing and cutting-off operations.

30. In an apparatus of the class described for manufacturing laminated staves, means for supplying separate webs of material, means for applying adhesive to said webs, means for assembling said webs, and means for pressing and conditioning the same to form a continuous transversely curved web, said means including a plurality of alternate pressing and heating mechanisms, the pressing mechanisms consisting of driven bottom rollers and independently adjustable spring pressed top rollers, said rollers having mating transversely curved faces for curving and compressing the web, the heating mechanisms including chambers interconnecting the pressing mechanisms, said chambers having separate heating elements to permit independent adjustment of temperature, whereby the heating and pressing of the web may be varied to properly condition the web for succeeding trimming, crozing and cutting-off operations.

31. In an apparatus of the class described for manufacturing laminated staves, means for supplying separate webs of material, means for applying adhesive to said webs, means for assembling said webs, means for pressing and conditioning the same to form a continuous transversely curved web, said means including a plurality of alternate pressing and heating mechanisms, the pressing mechanisms consisting of driven bottom rollers and independently adjustable spring pressed top rollers, said rollers having mating transversely curved faces for curving and compressing the web, the heating mechanisms having separate heating elements to permit independent adjustment of temperature, and trimming, crozing and cutting-off mechanisms immediately following the aforesaid conditioning means, the heating and pressing of the web in said conditioning means being adjusted to properly condition the web for the trimming, crozing and cutting-off operations.

ERNEST P. EVERETT.